United States Patent [19]

Kamada et al.

[11] Patent Number: 4,810,435
[45] Date of Patent: Mar. 7, 1989

[54] METHOD OF MAKING SUBSTRATE FOR MAGNETIC RECORDING MEDIUM

[75] Inventors: Koh Kamada; Hiroshi Hashimoto; Tsutomu Okita, all of Odawara, Japan

[73] Assignee: Fuji Photo Film Co., Ltd., Kanagawa, Japan

[21] Appl. No.: 918,076

[22] Filed: Oct. 14, 1986

[30] Foreign Application Priority Data

Oct. 14, 1985 [JP] Japan .................. 60-228061

[51] Int. Cl.4 ............................................. B29C 35/10
[52] U.S. Cl. ........................................ 264/22; 264/1.4; 264/24; 264/106; 427/44
[58] Field of Search ............... 264/22, 24, 27, 1.4, 264/280, 106, 107; 427/44

[56] References Cited

U.S. PATENT DOCUMENTS

| | | | |
|---|---|---|---|
| 4,294,782 | 10/1981 | Froehlig | 264/106 |
| 4,354,988 | 10/1982 | Bricot et al. | 264/106 |
| 4,407,880 | 10/1983 | Terao et al. | 264/106 |
| 4,521,445 | 6/1985 | Nablo et al. | 264/22 |
| 4,548,772 | 10/1985 | Kawamata | 425/174.8 R |
| 4,548,855 | 10/1985 | Ono et al. | 428/147 |
| 4,567,123 | 1/1986 | Ohtaka et al. | 264/1.4 |
| 4,581,189 | 4/1986 | Smith et al. | 264/175 |
| 4,587,066 | 5/1986 | Rodriguez | 264/1.4 |

FOREIGN PATENT DOCUMENTS

| | | | |
|---|---|---|---|
| 0168530 | 1/1986 | European Pat. Off. | 264/1.1 |
| 0175460 | 3/1986 | European Pat. Off. | 264/1.1 |
| 56-126132 | 10/1981 | Japan | 264/27 |
| 60-27539 | 2/1985 | Japan . | |
| 2055677 | 3/1981 | United Kingdom | 264/106 |

*Primary Examiner*—Jeffery Thurlow
*Attorney, Agent, or Firm*—Gerald J. Ferguson, Jr.

[57] ABSTRACT

A method of making a substrate for a magnetic recording medium comprises the steps of applying a radiation-polymerizable compound at least to one surface of a base sheet, closely contacting a surface of a transfer member with a surface of a coating layer thus formed of the radiation-polymerizable compound, exposing the coating layer to a radiation from the side of the base sheet or the transfer member, whichever is permeable to the radiation, and separating the transfer member form the surface of the coating layer. The surface of the transfer member is adjusted so that the arithmetical mean deviation at a cut-off value of 0.25 mm and at a measuring length of 80 mm is within the range of 0.001 μm to 0.050 μm, and the ratio of the maximum height at a cut-off value of 0.25 mm and at a measuring length of 20 mm to the arithmetical mean deviation is within the range of 5:1 to 20:1.

5 Claims, 1 Drawing Sheet

METHOD OF MAKING SUBSTRATE FOR MAGNETIC RECORDING MEDIUM

BACKGROUND OF THE INVENTION

1. Field of the Invention

This invention relates to a method of making a substrate used for a magnetic recording medium such as a video tape, an audio tape, a computer tape, a floppy disk, an electric still video floppy disk, or a magneto-optic disk.

2. Description of the Prior Art

As the recording density of magnetic recording media is increased, their substrates are required to have smoother and more slideable surfaces. Also for polyethylene terephthalate films, which are the main substrates used for magnetic recording media, in order to ensure the quality of high density magnetic recording, the film surface texture should be such that finer protrusions having more uniform heights are arrayed at a higher density than in films for packaging materials and electric insulation.

In recent years, attempts have been made to make a high density magnetic recording medium by applying a metal magnetic material onto a substrate together with a binder or by forming a thin ferromagnetic film of a metal on a substrate by vacuum deposition or sputtering. The surface texture of the substrate used for this purpose must satisfy strict requirements. Specifically, the surface texture must be such that the surface unevenness is of a very minute order, so minute that it cannot be accurately measured with a stylus type surface texture measuring instrument, and the heights of protrusions and recesses are uniform.

However, the surface texture of the film used for the magnetic recording medium can be improved only to a limited extent for the reasons described below. Namely, when the surface texture of the film is good or smooth, the frictional resistance of the film with respect to conveying rollers becomes large, and the film creases or zigzags in the film forming winding step. Further, the frictional resistance between the film surfaces themselves also increases, so that the form of the wound film roll is distorted.

In the case of a film for a coating type agnetic recording medium, a desired surface texture can be obtained by high-density filing of minute filler grains having uniform grain sizes. However, as the surface smoothness of the film becomes high, the yield in the film forming step decreases inevitably due to the aforesaid handling difficulty. On the other hand, in the case of a film for a thin metal film type magnetic recording medium, a high filling density and height uniformity are required for protrusions having heights of a more minute order (50 Å to 1,000 Å).

On the other hand, a method of forming a discontinuous film comprising a water-soluble high-molecular weight compound and fine grains on a film surface is disclosed in Japanese Unexamined Patent Publication Nos. 59(1984)-84927 and 59(1984)-121631. Also, Japanese Unexamined Patent Publication No. 60(1985)-27539 discloses a method of forming a coating film having many minute protrusions by applying a mixture of cross-linkable polyurethane, silicone and fine grains onto a film surface.

However, with these disclosed methods, slideability cannot be maintained substantially high, and the yield in the film forming step decreases to a value markedly lower than in the substrate for the coating type magnetic recording medium. Also, a magnetic recording medium made by forming a thin metal film on the obtained substrate film cannot exhibit high running characteristics.

As mentioned above, the manufacture cost of the substrate for the high density coating type magnetic recording medium and the substrate for the thin metal film type magnetic recording medium have heretofore been very high. Particularly, in the case of the substrate for the thin metal type magnetic recording medium, no technique for imparting high running characteristics has been established.

SUMMARY OF THE INVENTION

The primary object of the present invention is to provide a method of making a substrate for a magnetic recording medium, which imparts the substrate surface texture required for a coating type magnetic recording medium and a deposition type magnetic recording medium to a film so that a high density magnetic recording medium exhibiting both high electromagnetic characteristics and high running durability is prepared.

Another object of the present invention is to provide a method of making a substrate for a magnetic recording medium, which is suitable for preparing a high density magnetic recording medium exhibiting both high electromagnetic characteristics and high running durability at a low manufacture cost.

The method of making a substrate for a magnetic recording medium in accordance with the present invention is characterized by applying a radiation-polymerizable compound to a surface of a base sheet, preferably a polyester film, closely contacting a surface of a transfer member exhibiting a predetermined surface roughness with a surface of the coating layer thus formed, exposing the coating layer to a radiation for causing polymerization of the coating layer, and thereafter separating the transfer member from the surface of the coating layer, whereby a magnetic recording medium substrate exhibiting a desired surface configuration is obtained.

In the present invention, in order to obtain a magnetic recording medium substrate provided with a surface texture suitable for preparing a high density magnetic recording medium exhibiting both high electromagnetic characteristics and high running stability, the surface roughness of the transfer member is adjusted so that the arithmetical mean deviation (Ra) at a cut-off value of 0.25 mm and a measuring length of 80 mm is within the range of 0.001 $\mu$m to 0.050 $\mu$m, and the ratio of the maximum height (PVmax) at a cut-off value of 0.25 mm and a measuring length of 20 mm to said arithmetical mean deviation is within the range of 5:1 to 20:1.

In order to expose the coating layer to a radiation, at least either one of the base sheet and the transfer member must be permeable to the radiation.

In the case where a substrate for the thin metal film type magnetic recording medium is made, a plurality of dimples having a depth (d) within the range of 50 Å to 1,000 Å and a ratio of depth to diameter (D) within the range of $10^{-2}:1$ to $1:1$ should preferably be provided on the surface of the transfer member so that the area occupation ratio (Adim) of the dimples on the surface of the transfer member is within the range of 1% to 60%. Also, in the condition provided with the dimples, the arithmetical mean deviation should be limited to a value within the range of 0.001 μm to 0,010 μm.

Though a transfer plate or the like may be used as the transfer member, a roll or a belt-like member should preferably be used for continuously making the substrate for a magnetic recording medium. As the roll, a hollow drum-like roll may also be used.

When impartation of the surface roughness to the substrate for a magnetic recording medium is to be conducted simultaneously on two surfaces of the substrate, the radiation-polymerizable compound may be applied to the two surfaces of the base sheet, a pair of the transfer members may respectively be closely contacted with the coating layers thus formed from the opposite sides of the base sheet, and the coating layers may then be exposed to a radiation. In this case, the base sheet and at least one of the transfer members are made permeable to the radiation, and the coating layers are exposed to the radiation from the side of the transfer member permeable to the radiation. When both the transfer members are permeable to the radiation, the coating layers may be exposed to the radiation from either side or from both sides. In the case where a roll is used as the transfer member, the roll may be fabricated into a drum-like shape, and the radiation conducted from inside of the drum.

With the method of making a substrate for a magnetic recording medium in accordance with the present invention, it becomes possible to prepare a magnetic recording medium exhibiting high electromagnetic characteristics and high running durability. For the purpose of decreasing the manufacture cost of the magnetic recording medium or preparing a magnetic recording medium exhibiting high running durability and electromagnetic characteristics, when a technique of imparting the desired surface configuration to the base sheet (film) in a step immediately before the formation of the magnetic recording layer (magnetic material layer) is established, it becomes possible to use a rough surface film, which may be formed at a high yield, as the film used for preparing the magnetic recording medium. As a result, handling in the film forming step and the step of forming the magnetic surface becomes easy, and the manufacture cost of the magnetic recording medium as the final product becomes low. Also, in the case of the thin metal film type magnetic recording medium, it is possible to obtain a desired fine surface configuration.

DESCRIPTION OF THE PREFERRED EMBODIMENTS

Figure 1:
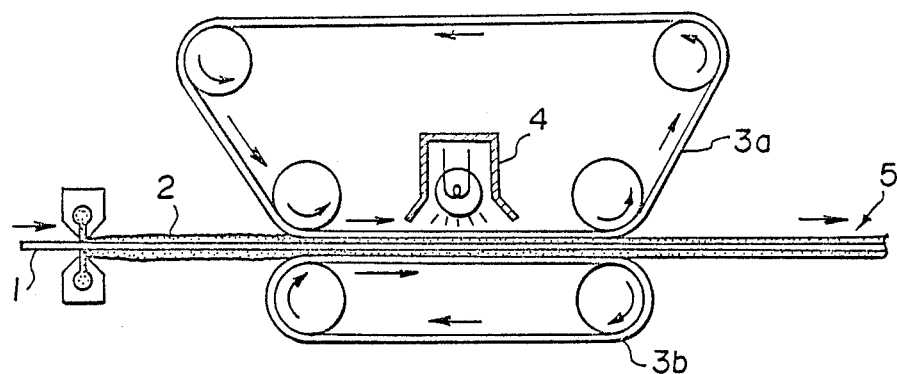
FIG. 1 is a side view showing an example of the apparatus used for carrying out the method of making a substrate for a magnetic recording medium in accordance with the present invention.

The present invention will hereinbelow be described in further detail.

The radiation-polymerizable compound used in the present invention may be a compound containing one or more unsaturated carbon-carbon bonds per molecule, such as an acrylic acid ester, an acrylamide, a methacrylic acid ester, a methacrylamide, an allyl compound, a vinyl ether, a vinyl ester, a vinyl heterocyclic compound, a N-vinyl compound, styrene or a homoloque thereof, crotonic acid or a homoloque thereof, itaconic acid or a homoloque thereof, or an olefin. Among the above enumerated compounds, preferable compounds are those containing two or more acryloyl groups or methacryloyl groups, for example, acrylates such as diethylene glycol diacrylate, triethylene glycol diacrylate, tetraethylene glycol diacrylate, trimethylolpropane triacrylate, and pentaerythritol tetraacrylate, methacrylates such as diethylene glycol dimethacrylate, triethylene glycol trimethacrylate, tetraethylene glycol dimethacrylate, trimethylolpropane trimethacrylate, and pentaerythritol tetramethacrylate, or esters of the other bifunctional or higher functional polyols with acrylic acid or methacrylic acid.

The above enumerated compounds may be of high molecular weight, and are preferably compounds having an ester bond with acrylic acid or methacrylic acid at the terminal of the main chain or at the side chain of the high-molecular chain as described, for example, in "Fatipec Congress", A. Vranckem, Vol. 11, 19 (1972). For example, the compound represented by the formula

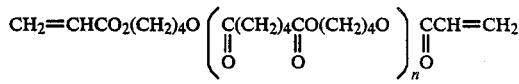

may be used. The polyester skeleton may be a polyurethane skeleton, an epoxy resin skeleton, a polyether skeleton, a polycarbonate skeleton, or a mixture of two or more of these skeletons. Though the molecular weight is not limited, it should preferably be within the range of 1,000 to 20,000.

The radiation-polymerizable compounds listed above may be used either alone or in combination at an arbitrary ratio.

The radiation-polymerizable compound may also be used in combination with a thermoplastic resin such as a vinyl chloride-vinyl acetate copolymer, a cellulose resin, an acetal resin, a vinyl chloride-vinylidene chloride resin, a urethane resin or an acrylonitrile-butadiene resin.

In the present invention, electron rays or ultraviolet rays are used as the radiation. When ultraviolet rays are used, a photopolymerization initiator must be added to the radiation-polymerizable compound.

As the photopolymerization initiator, an aromatic ketone is used.

Though any aromatic ketone may be used, the aromatic ketone should preferably exhibit a comparatively large extinction coefficient at wavelengths of 254 nm, 313 nm and 365 nm, at which the line spectrum of a mercury vapor lamp normally used as the ultraviolet ray source arises. Typical examples of the aromatic ketone are acetophenone, benzophenone, benzoin, ethyl ether, benzyl methyl ketal, benzyl ethyl ketal, benzoin isobutyl ketone, hydroxydimethyl phenyl ketone, 1-hydroxycyclohexyl phenyl ketone, 2,2-diethoxyacetophenone, and Michler's ketone.

The aromatic ketone may be used at a ratio within the range of 0.5 to 20 parts by weight per 100 parts by weight of the radiation-polymerizable compound, preferably within the range of 2 to 15 parts by weight per 100 parts by weight of the radiation-polymerizable compound, more preferably within the range of 3 to 10 parts by weight per 100 parts of the radiation-polymerizable compound.

Various organic solvents may be used when the radiation-polymerizable compound or a mixture thereof with an aromatic ketone is applied onto the substrate. Examples of the organic solvents are ketones such as acetone, methyl ethyl ketone, methyl isobutyl ketone, and cyclohexanone; alcohols such as methyl alcohol, ethyl alcohol, propyl alcohol, and butyl alcohol; esters such as methyl acetate, ethyl acetate, butyl acetate, ethyl lactate, and glycol acetate monoethyl ether; ethers such as ethyl ether, ethylene glycol dimethyl ether, ethylene glycol monoethyl ether, dioxane, and tetrahydrofuran; aromatic hydrocarbons such as benzene, toluene, and xylene; chlorinated hydrocarbons such as methylene chloride, ethylene chloride, carbon tetrachloride, chloroform, ethylene chlorohydrin, and dichlorobenzene, or the like.

As an electron ray accelerator, a scanning type, a double scanning type or a curtain beam type may be used, among which the curtain beam type is preferable since it is relatively inexpensive and a large output is obtained. The electron ray characteristics may be such that the acceleration voltage is within the range of 10 kV to 1,000 kV, preferably within the range of 50 kV to 300 kV, and the absorbed dose is within the range of 0.5 to 20 megarad, preferably within the range of 1 to 10 megarad. When the acceleration voltage is lower than 10 kV, the energy transmission amount becomes insufficient. When it is higher than 1,000 kV, the energy utilization efficiency for polymerization decreases and the polymerizing operation becomes uneconomical.

When the absorbed dose is lower than 0.5 megarad, the curing reaction becomes insufficient and a high magnetic layer strength cannot be obtained. When it is higher than 20 megarad, the energy utilization efficiency for curing becomes low, and the substrate exposed to electron rays generates heat, resulting in deformation when the substrate is formed of a plastic material.

The substrate used in the present invention may be formed of, for example, a polyester such as polyethylene terepthalate, or polyethylene-2,6-naphthalate; a polyolefin such as polyethylene, or polypropylene; a cellulose derivative such as cellulose triacetate, cellulose diacetate, cellulose acetate butyrate, or cellulose acetate propionate; a vinyl resin such as polyvinyl chloride, or polyvinylidene chloride; or a plastic material such as polycarbonate, polyimide, or polyamide imide. In accordance with the intended application, it is also possible to use a non-magnetic metal such as aluminium, copper, tin, zinc, or non-magnetic alloy containing at least one of these metals, or stainless steel; paper, baryta paper, or paper coated or laminated with an α-polyolefin having two to ten carbon atoms such as polyethylene, polypropylene or ethylene-butene copolymer.

In the present invention, PVmax of the surface of the non-magnetic substrate should preferably be equal to or larger than PVmax of the surface of the transfer member.

The surface configuration of the transfer member used in the present invention may be considered to be the reverse of the surface configuration which the magnetic recording medium substrate made in accordance with the present invention should have. Therefore, for making a substrate for an audio tape, a transfer member exhibiting a surface roughness within the range of $0.015 \leq Ra \leq 0.050$ (mm) and $5 \leq PVmax/Ra \leq 20$ may be used. For making a substrate for a coating type video tape, a transfer member having a surface roughness within the range of $0.003 \leq Ra \leq 0.020$ (mm) and $5 \leq PVmax/Ra \leq 20$ may be used. When a substrate for a thin metal film type magnetic tape should be used, a transfer member having a surface provided with a plurality of dimples satisfying the conditions $50 \leq d \leq 1,000$ (Å), $10^{-2} \leq d/D \leq 1$ and $1 \leq Adim \leq 60$ (%), and exhibiting a surface roughness within the range of $0.001 \leq Ra \leq 0.010$ (mm) and $5 \leq PVmax/Ra \leq 20$ may be used. Thus, in accordance with the present invention, it is possible to adjust the surface roughness of the substrate to any desired roughness.

The transfer member used in the present invention should preferably exhibit low adhesion to the radiation-polymerizable compound. Thus the transfer member should preferably be formed by chrome-plating a planished iron plate surface. The roughness and fine dimples which the surface of the transfer member should have may be formed by applying electric shocks (current inversion) during plating. The transfer member may also be any plate, e.g. a molded plastic plate or a ceramic plate, any roll or any belt-like member or the like insofar as the predetermined surface roughness requirement is satisfied. The base sheet used in the present invention should preferably exhibit high adhesion to the radiation-polymerizable compound. In order to improve the adhesion of the base sheet to the radiation-polymerizable compound, the base sheet may be exposed to a radiation or subjected to prime coating prior to the application of the radiation-polymerizable compound thereto.

As shown in FIG. 1, in order to continuously impart the desired surface roughness to the two surfaces of the base sheet, a base sheet 1 may be conveyed in the direction as indicated by the arrow, and a radiation-polymerizable compound 2 is applied to the two surfaces of the base sheet 1. Then, the base sheet 1 is sandwiched between belt-like members 3a and 3b having the predetermined surface configuration, at least one thereof (belt-like member 3a in this case) being permeable to a radiation. The base sheet 1 is exposed to a radiation emitted by an electron ray (ultraviolet ray) emitting device 4 from the side of the radiation-permeable belt-like member 3a. Then, the belt-like members 3a and 3b are removed to obtain a substrate 5 for a magnetic recording medium.

EXAMPLES

The present invention will further be illustrated by the following non-limitative examples and with reference to Table 1 and accompanying drawings.

Table 1 shows results of evaluation of various characteristics of Examples in accordance with the present invention and Comparative Examples. Examples A1, A2 and A3, and Comparative Examples A1' and A2' correspond to a substrate for a coating type magnetic recording medium. Examples B1, B2, B3 and B4, and Comparative Examples B1', B2', B3' and B4' correspond to a substrate for a deposition type magnetic recording medium.

(A) Description of Examples A1, A2 and A3, and Comparative Examples A1' and A2' in Table 1

Evaluation conditions of the Examples and the Comparative Examples are as described below.

The following coating composition kneaded and dispersed in a ball mill for 10 hours was applied to a thickness of 0.5μ onto a 12.5 μ-thick polyethylene terephthalate substrate.

Coating composition:

| Diethylene glycol diacrylate | 250 parts |
| --- | --- |
| Toluene | 100 parts |
| Acetone | 100 parts |

Figure 2:
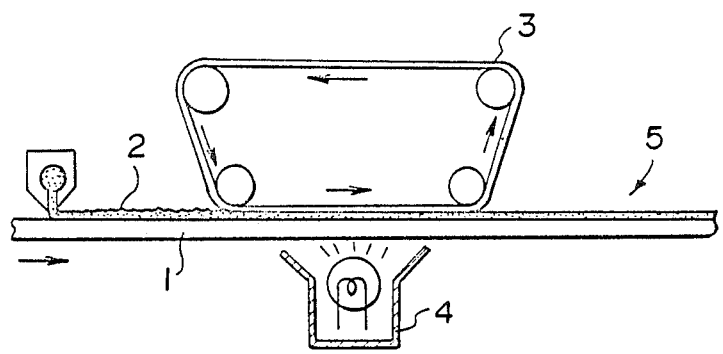
FIG. 2 is a side view showing another example of the apparatus for carrying out the method of making a substrate for a magnetic recording medium in accordance with the present invention.

As shown in FIG. 2, a base sheet 1 was conveyed in the direction as indicated by the arrow, and a belt-like member 3 was closely contacted with the base sheet 1 on the side coated with a coating composition 2 as described above. Before separation of the belt-like member 3 from the coated surface, electron ray irradiation was conducted with an electron ray emitting device 4 from the side of the base sheet 1 opposite to the coated surface.

The surface roughness (surface configuration) of the belt-like member 3 was different between the Examples and the Comparative Examples, and was determined by measuring the arithmetical mean deviation (Ra) (at a cut-off value of 0.25 mm and a measuring length of 80 mm), and the maximum height (PVmax) (at a cut-off value of 0.25 mm and a measuring length of 20 mm) in accordance with JIS-B-0601. The forming method was the iron plate+chrome-plating method.

The electron ray irradiating conditions with the electron ray emitting device 4 were such that the acceleration voltage was 160 kV, the beam current was 5 mA and the absorbed dose was 5 Mrad.

Figure 3:
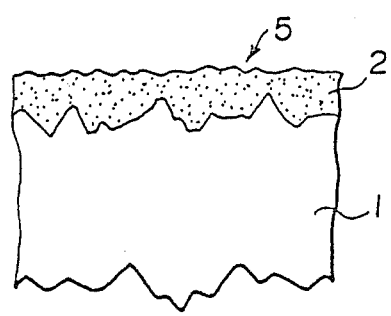
FIGS. 3 and 4 are views for explaining Table 1, which shows the results of evaluation of a magnetic recording medium substrate made by use of the apparatus shown in FIG. 2.

After a magnetic recording medium substrate 5 as shown in FIG. 3 was formed under the aforesaid conditions, running characteristics and scratch resistance were investigated as described below.

Figure 4:
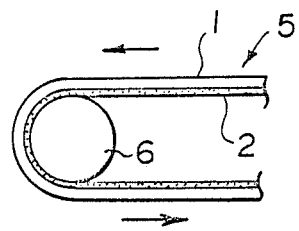

Running characteristics:

As shown in FIG. 4, the prepared substrate 5 was made to run in a tape form at an angle of 180° on a secured metal (SUS) guide rod 6 so that the radiation-polymerized layer 2 contacted the guide rod 6. Thus, the dynamic coefficient of friction (μ) was measured. In Table 1, the following symbols have the following meanings.

o: μ=0.10 to 0.49
◉ : μ<0.10
Δ: μ=0.50 to 1.0
x: μ>1.0

Scratch resistance:

As shown in FIG. 4, the prepared substrate 5 in the tape form was made to run 300 times repeatedly on the secured metal (SUS) guide rod 6 so that the radiation-polymerized layer 2 contacted the guide rod 6. Thus scratches arising on the substrate 5 were observed.

◉ : No scratching
o: Very little scratching
x: Much scratching

Also, the surface roughness of the radiation-polymerized layer 2 was evaluated with a stylus type surface texture measuring instrument. In Table 1, the surface roughness of the belt-like member 3 used and the surface roughness of the prepared substrate 5 do not necessarily coincide with each other since, when the protrusions and recesses are minute, the stylus type surface texture measuring instrument is insensitive to recesses and sensitive to protrusions.

A 5 μm-thick magnetic layer which contains Co-containing magnetic iron oxide was formed on the surface of the substrate 5. The magnetic layer coating composition was as shown below.

[Magnetic layer coating composition]

| Co-containing magnetic iron oxide ($S_{BET}$ 35 m$^2$/g) | 100 parts |
| --- | --- |
| Nitrocellulose | 10 parts |
| Polyurethane resin (Trade name "Nipporan 2,304") | 8 parts |
| Polyisocyanate | 8 parts |
| Cr$_2$O$_3$ | 2 parts |
| Carbon black (Average grain size: 20 μm) | 2 parts |
| Stearic acid | 1 part |
| Butyl stearate | 1 part |
| Methyl ethyl Ketone | 300 parts |

Thus, while the surface roughness of the belt-like member 3 was changed among Examples and Comparative Examples in (A), the maximum diameter, the depth and the surface area occupation ratio of the fine dimples formed on the belt-like member 3 were changed among examples and comparative examples in (B). The fine dimples were formed by providing electric shock (reversion of electric currents) during plating.

The video sensitivity, C/N, and running durability of the sample thus obtained were investigated (VTR used: trade name "NV-8800" supplied by Matsushita Densan Seizo K.K.). Video sensitivity: The reproduction output at 4 MHz was measured with reference to Comparative Example A2' (±0 dB). C/N: The ratio of carrier to noise when 3 MHz and 3.5 MHz carriers were recorded and reproduced was measured with reference to Comparative Example A2' (±0 dB). Running durability: Decrease in output was measured after running 100 times (the allowable range being within −1.0 dB). (B) Description of Examples B1, B2, B3 and B4, and Comparative Examples B1', B2', B3' and B4' in Table 1

The experimental conditions in the Examples and the Comparative Examples were nearly the same as in (A). However, instead of changing the surface roughness of the belt-like member 3 among the Examples and the Comparative Examples, fine dimples (recesses) were formed on the belt-like member 3, and the maximum diameter, the depth and the surface area occupation ratio of the fine dimples were made different among the Examples and the Comparative Examples in (B). The video sensitivity and C/N were measured with reference to Comparative Example B4' (±0 dB). (In the case of the deposition type magnetic recording medium, since a high image quality is aimed at, the characteristics are desired to be superior by 5 dB or 6 dB to those of the coating type magnetic recording medium.)

Cobalt-nickel (nickel content: 20 wt %) was obliquely deposited by a continuous deposition machine onto the radiation-polymerized layer 2 of the substrate film 5 obtained by transferring of the belt-like member 3. Thus a thin ferromagnetic film having a film thickness of 2,000 Å was formed. Then, the medium was slit into a ½ inch width to obtain video magnetic tape samples (Table 1, Comparative Example B1').

TABLE 1

| Sample No. | | Base sheet, polyethylene terephthalate film | | | Surface configuration of belt-like member (transfer member) | | | | | | Prepared substrate characteristics Processed surface side | |
|---|---|---|---|---|---|---|---|---|---|---|---|---|
| | | | | | Surface roughness | | | Dimples | | | | |
| | | Ra μm | PVmax μm | PVmax/Ra | Ra μm | PVmax μm | PVmax/Ra | Max. dia. Å | Depth Å | Area ratio % | Ra μm | PVmax μm |
| Example | A1 | 0.020 | 0.80 | 40 | 0.015 | 0.08 | 5.3 | — | — | — | 0.020 | 0.12 |
| | A2 | 0.020 | 0.80 | 40 | 0.015 | 0.15 | 10 | — | — | — | 0.016 | 0.19 |
| | A3 | 0.020 | 0.80 | 40 | 0.015 | 0.30 | 20 | — | — | — | 0.016 | 0.33 |
| Comparative Example | A1' | 0.020 | 0.80 | 40 | 0.080 | 1.60 | 20 | — | — | — | 0.080 | 1.60 |
| | A2' | 0.020 | 0.80 | 40 | 0.015 | 0.45 | 30 | — | — | — | 0.015 | 0.45 |
| Example | B1 | 0.015 | 0.15 | 10 | 0.003 | 0.02 | 6.7 | 390 | 110 | 6.5 | 0.003 | 0.02 |
| | B2 | 0.015 | 0.15 | 10 | 0.003 | 0.02 | 6.7 | 390 | 110 | 48 | 0.003 | 0.02 |
| | B3 | 0.015 | 0.15 | 10 | 0.003 | 0.02 | 6.7 | 1700 | 970 | 8.0 | 0.004 | 0.03 |
| | B4 | 0.015 | 0.15 | 10 | 0.003 | 0.02 | 6.7 | 1700 | 970 | 54 | 0.003 | 0.02 |
| Comparative Example | B1' | 0.015 | 0.15 | 10 | 0.003 | 0.02 | 6.7 | 120 | 30 | 0.7 | 0.003 | 0.02 |
| | B2' | 0.015 | 0.15 | 10 | 0.003 | 0.02 | 6.7 | 120 | 30 | 42 | 0.003 | 0.02 |
| | B3' | 0.015 | 0.15 | 10 | 0.004 | 0.03 | 7.5 | 4300 | 2700 | 0.3 | 0.026 | 0.22 |
| | B4' | 0.015 | 0.15 | 10 | 0.005 | 0.03 | 6.0 | 4300 | 2700 | 36 | 0.007 | 0.07 |

| Sample No. | | Prepared substrate characteristics | | | | Prepared magnetic tape characteristics | | | | |
|---|---|---|---|---|---|---|---|---|---|---|
| | | Running characteristics | | Scratch resistance | | Magnetic material used | Video sensitivity dB | C/N | | Output drop after 100 PS running dB |
| | | 23° C. 50% RH | 40° C. 80% RH | 23° C. 50% RH | 40° C. 80% RH | | | at 3.0 MHz dB | at 3.5 MHz dB | |
| Example | A1 | O | O | O | O | Co—γFe$_2$O$_3$ (coating type) | +2.5 | +3.0 | +2.5 | −0.8 |
| | A2 | O | O | O | O | Co—γFe$_2$O$_3$ (coating type) | +3.0 | +3.4 | +2.9 | −0.5 |
| | A3 | O | O | O | O | Co—γFe$_2$O$_3$ (coating type) | +2.2 | +2.6 | +2.0 | −0.6 |
| Comparative Example | A1' | ⊚ | ⊚ | ⊚ | ⊚ | Co—γFe$_2$O$_3$ (coating type) | −30 | −30 | −30 | −0.2 |
| | A2' | O | O | O | O | Co—γFe$_2$O$_3$ (coating type) | ±0 | ±0 | ±0 | −0.8 |
| Example | B1 | O | Δ | O | O | Co—Ni (deposition type) | +2.2 | +2.1 | +2.0 | −0.8 |
| | B2 | O | O | O | O | Co—Ni (deposition type) | +2.0 | +1.6 | +1.7 | −0.6 |
| | B3 | O | O | O | O | Co—Ni (deposition type) | +1.9 | +1.6 | +1.9 | −0.1 |
| | B4 | O | O | O | O | Co—Ni (deposition type) | +1.8 | +1.7 | +1.6 | −0.4 |
| Comparative Example | B1' | X | X | X | X | Co—Ni (deposition type) | −3.6 | −3.5 | −3.4 | −12.0 |
| | B2' | O | Δ | O | X | Co—Ni (deposition type) | +3.6 | +3.4 | +3.3 | −4.8 |
| | B3' | Δ | X | X | X | Co—Ni (deposition type) | −2.0 | −2.4 | −2.2 | −5.4 |
| | B4' | O | O | O | O | Co—Ni (deposition type) | ±0 | ±0 | ±0 | −0.7 |

We claim:

1. A method of making a substrate for a magnetic recording medium, which comprises the steps of:
  (i) applying a radiation-polymerizable compound to at least one surface of a base sheet,
  (ii) closely contacting a surface of a transfer member with a surface of a coating layer thus formed of said radiation-polymerizable compound, said surface of said transfer member being adjusted so that an arithmetical means deviation at a cut-off valve of 0.25 mm and at a measuring length of 80 mm is within the range of 0.001 μm to 0.050 μm, and the ratio of the maximum height at a cut-off value of 0.25 mm and at a measuring length of 20 mm to said arithmetical mean deviation is within the range of 5:1 to 20:1, wherein at least one of said base sheet and said transfer member is permeable to a radiation,
  (iii) exposing said coating layer to the radiation from the side of said base sheet or said transfer member, whichever is permeable to the radiation, and
  (iv) separating said transfer member from the surface of said coating layer whereby a resulting magnetic recording medium has relatively high electromagnetic characteristics and a relatively high running durability.

2. A method as defined in claim 1 wherein said surface of said transfer member is provided with a plurality of dimples having a depth within the range of 50 Å to 1,000 Å, a ratio of said depth to a diameter within the range of $10^{-2}:1$ to 1:1, and an area occupation ratio within the range of 1% to 60% on said surface of said transfer member, and said arithmetical mean deviation is within the range of 0.001 μm to 0.010 μm.

3. A method as defined in claim 1 or 2 wherein said transfer member is a roll or a belt-like member.

4. A method as defined in claim 1, wherein said base sheet is permeable to the radiation, said application of said radiation-polymerizable compound to said base sheet is conducted on the two surfaces of said base sheet, said close contacting of said transfer member with said coating layer is conducted by sandwiching said base sheet from the two sides thereof between a pair of said transfer members at least one of which is permeable to the radiation, and said exposure of said coating layer to the radiation is carried out from the side of said radiation-permeable transfer member.

5. A method as defined in claim 1 or 2 wherein said transfer member is a polished and chrome-plated iron member.

* * * * *